April 22, 1969  C. J. HOLTKAMP  3,440,402
OVEN HEATER CONTROL
Filed March 4, 1966

WITNESSES:

INVENTOR
Calvin J. Holtkamp
BY
ATTORNEY

United States Patent Office 3,440,402
Patented Apr. 22, 1969

3,440,402
OVEN HEATER CONTROL
Calvin J. Holtkamp, Mansfield, Ohio, assignor to Westinghouse Electric Corporation, Pittsburgh, Pa., a corporation of Pennsylvania
Filed Mar. 4, 1966, Ser. No. 531,858
Int. Cl. F27d 11/02; A21b 1/22
U.S. Cl. 219—412                                6 Claims

ABSTRACT OF THE DISCLOSURE

An oven heating and control arrangement in a heat cleaning oven in which the upper heater is located closely below vent openings through which gaseous products generated during the heat cleaning operation pass, the heater being cyclically energized through circuit interrupting means at a rate to maintain the heater surface temperature in a range effective to eliminate the gaseous products flowing by the heater and to provide substantially all of the heat for heat cleaning in the oven.

---

Figure 1:
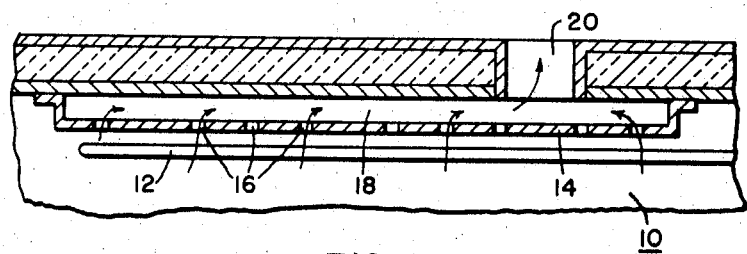

This invention relates to oven control means generally, and specifically to control means for a heating element which serves at least a dual function of emitting heat for cooking and other operations as well as providing for the elimination of smoke and other gaseous products sweeping by the element.

The invention is particularly applicable to a cooking oven arrangement such as disclosed in Kastovitch U.S. patent application, Ser. No. 521,932, now abandoned in favor of continuation-in-part application Ser. No. 552,663. In that arrangement the upper heating element in the cooking cavity not only provides heat for a broiling operation, but also serves as a smoke eliminator by virtue of its location closely below vent opening means through which smoke and other gaseous products of combustion are constrained to pass as they exit from the cooking cavity.

This broiler element is also adapted to be used to provide heat for the pyrolytic decomposition of food soils in the cooking cavity when the oven is of the character adapted for a heat cleaning type of operation. In both operations it is desirable that the energization of the element be controlled to maintain a sufficiently high surface temperature for effective smoke elimination, and in the heat cleaning operation smoke elimination is virtually mandatory.

Accordingly, an object of this invention is to provide means for controlling the energization of the heating element so that its temperature remains in a range providing sufficiently effective smoke elimination during periods when the oven is being operated in a manner requiring smoke elimination.

For carrying out the smoke elimination function it has been found desirable to energize the heating element (over which the smoke and other gaseous substances sweep) to maintain a sheath temperature of the element in a range of about 1200–1550° F. Sheath temperatures below 1200° F. are not considered to provide sufficiently effective smoke elimination, while sheath temperatures above about 1550° F. cause the life of the heating element to be shortened to a degree considered intolerable. It will be appreciated that the limits of the range do not represent critical values in the sense that all smoke elimination ceases at sheath temperatures below 1200° F., or that the element failure will occur immediately at 1550° F. Rather, these values represent the practically desirable values determined in light of the materials now available, and the results considered desirable on balance.

A contemporaneously filed, copending patent application, Ser. No. 531,687 of Edmund G. Pankow, entitled, Oven Control Means, discloses one arrangement for controlling the heating element temperature by providing means for increasing the resistance of the circuit through which the heating element is energized in accordance with temperatures reflecting the temperature of the heating element.

In accordance with my invention I provide means for cyclically energizing the heating element to produce an average heat output adequate for carrying the oven through its heat cleaning operation while maintaining the heating element at temperatures in the stated range. The currently preferred way of cyclically energizing the heating element is by use of thermal cycling means in series with the element.

Figure 2:
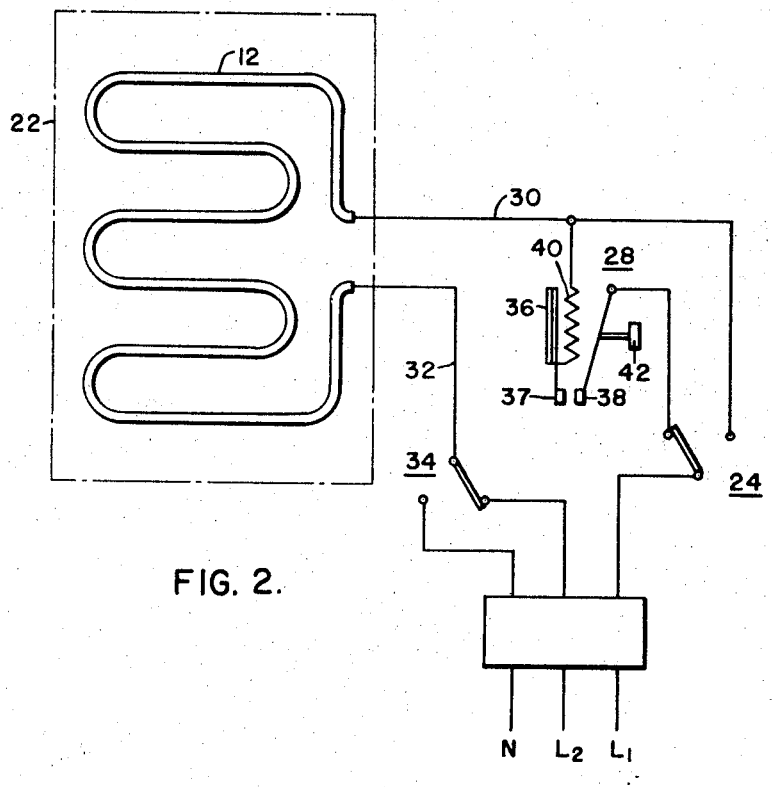

One embodiment of the invention will be described in connection with the accompanying drawing, wherein:

FIGURE 1 is a somewhat diagrammatic view, in the nature of a vertical section showing a fragmentary upper portion of an oven in which the arrangement may be incorporated; and FIG. 2 is a simplified, partly diagrammatic view of a circuit arrangement according to the invention.

FIGURE 1 illustrates an upper portion of the type of oven provided with a smoke eliminator arrangement according to the noted Kastovitch application. The oven cooking cavity 10 is provided with a multifunction heating element 12 closely underlying the wall 14 having vent openings or ports 16 arranged to follow the array presented by the element. Smoke and gaseous products to be eliminated sweep over the element, through the ports, and into the plenum 18 from which they are exhausted through the plenum outlet 20. Further details of the arrangement may be found in the noted Kastovitch application.

In FIGURE 2 the confines of the oven cavity 10 is represented by the broken line outline 22. The electrical power lines L1, L2 and N are connected through various switch and control elements to energize the heating element 12 in accordance with the cooking or other operation to be carried out. Only three switches are shown since they are deemed sufficient to adequately describe the invention. In the switch position shown, the element 12 is connected to function according to the invention.

Switch 24 as shown connects L1 to line 26, the thermal cycling switch 28 which, when closed, makes the connection to line 30 which in turn is connected to one side of the broil element 12. The other side of the broil element is connected through line 32 and switch 34 to L2. Switch 24 may be positioned alternately to connect L1 directly to line 30 so that the cycling switch 28 is out of the circuit, and switch 34 may be positioned to connect line 32 to the neutral line N.

Thermal cycling switch 28 is generally conventional and is accordingly shown schematically. One switch of this general character which will provide satisfactory operation is identified as Westinghouse Electric Corporation Thermal Cycling Switch Q140881. The main parts of the switch of concern herein are the bimetal switch blade 36 carrying contact 37 in a position to close against the contact 38, the resistance heater 40 which provides the heat to cause periodic opening of the bimetal bar 36 when the heater is energized, and bias adjusting means 42 for setting the cycling time of the thermal cycling switch. The general mode of operation of such a switch is as follows. With the switch contacts 37 and 38 closed to energize resistance heater 40, the bimetal blade 36 is heated and after a period of time opens the switch by moving contact 37 away from contact 38. This deenergizes the heater and as the blade cools it moves to the right to close the contacts again to permit current flow through the switch. This of course again energizes the resistance heater 40 to cause subsequent opening of the switch. The bias means 42 is adjustable to establish a percent on time, or in other words, a ratio of contacts closed time to total time. Such switches also usually include means for compensating for variations in ambient temperature at the switch location, but such means are not deemed to be of concern in connection with the present description and accordingly are not shown.

When the oven is to undergo a heat cleaning operation the switches 24 and 34 are set to the positions illustrated so that the heating element 12 is across, say, 236 volts when the thermal cycling switch 28 is closed. The circuit is broken of course each time the thermal cycling switch opens. Safety means such as safety interlocks, signal lights, and the like are also set for proper functioning when the heat cleaning operation is to take place.

With the thermal cycling switch closed, the heating element 12 is energized, as well as the cycling switch resistance heater 40, for a period of about 15 seconds. Then the heat emitted by the heater 40 causes the thermal cycling switch to open for a period of about 5 seconds and the heating element 12 is accordingly deenergized for this period. Then as the bimetal blade 36 of the thermal cycling switch cools it again closes the contacts 37 and 38 for another period of about 15 seconds to again energize the heating element 12 in the oven. As this continues the heating element 12 heats the oven up into the heat cleaning range which for present purposes of example may be assumed to be about 1000° F. Throughout the period of heat cleaning operation the thermal cycling switch 28 continues to cycle on and off. When the heat cleaning operation is to be terminated, in response to a time or temperature condition for example, the circuit to the heating element is opened by means of other switches not shown. For simplicity it is currently preferred that the cyclical energization of the element 12 take place from its initial energization until the termination of the heat cleaning cycle. However it will be appreciated that while the oven is rising toward the range of heat cleaning temperatures, means could be provided in the circuit for constant energization of the element until the element overheating condition is approached.

The temperatures and wattages involved for satisfactory operation will now be given by way of example to aid in a complete understanding of the invention. It has been determined that if the broil heater 12 produces approximately 2700 watts in a typical 30 inch wide oven of the type which is insulated to adapt it for a heat cleaning operation, sufficient heat will be produced to raise the oven temperature to the exemplary 1000° F. within a reasonable time. However it is preferred that the broiling element have a capacity of producing at least 3400 watts to obtain good broiling results in a broil operation. Accordingly, the resistance element of the broil element 12 is sized for 3400 watt output, and the cycling switch 28 is adjusted so that the energization time of the element during cycling effectively reduces this wattage of 3400 of the broil heater during the cleaning cycle to produce average wattage of 2700 watts. To reduce the sheath temperature to the range of values desired and to prevent it from normally rising above the upper limit of the value, it has been found desirable to use a sheath which is physically of a size adapted to be used with a 3800 watt resistance element. Thus its sheath surface area is increased relative to the normal sheath used with a 3400 watt resistance element.

Operating a broil heater of that wattage and in the fashion described provides a sheath temperature of the broil heater within the range of temperatures desirable to provide smoke elimination without causing overheating of the heating element. While the heating element tends to cool off slightly each time the thermal cycling switch opens, the reenergization of the heating element maintains the sheath temperature of the element above the lower limit of about 1200° F. The switch cycle rate is determined of course by matching it to the characteristics of the oven and the broil heater. Depending upon the combination of oven and heater, other cycling rates may be preferred.

It is noted that the currently preferred circuit arrangement shown permits the broil element 12 to be energized for a pure broiling function at 3400 watts constant output by energizing the element directly across the lines L1 and L2. To do this, switch 24 is positioned to connect L1 to line 30 and by-passing the thermal cycling switch. While the broil element will produce a broiling effect even with the thermal cycling switch in the circuit, its temperature is reduced sufficiently that the superior broiling results are not achieved. The broil element 12 may be also energized at ¼ of its wattage to supplement heating of the oven during a bake operation by placing switch 24 in the alternate position connecting L1 to line 30, and placing switch 34 in a position connecting line 32 to neutral.

It is noted that the thermal cycling switch is the currently preferred arrangement to obtain the cyclical energization of the heating element. The thermal cycling switch is a relatively inexpensive device and possesses flexibility of adjustment for adaptation to various ovens and various heaters. Other means for obtaining the cyclical energization such as a solid state SCR circuit may also be adapted to this service, but are not currently preferred because of their relatively greater cost.

I claim as my invention:

1. A cooking oven of the heat cleaning type comprising:
    means defining a cooking cavity including a top wall;
    an upper heating element mounted immediately below said top wall;
    a circuit connecting said heating element to a power source;
    vent opening means arrayed in said top wall above said element for constraining gaseous products generated during a heat cleaning cycle to sweep by said element in exiting from said cavity; and
    circuit interrupting means in said circuit for cyclically energizing said heating element at a rate to maintain a surface temperature of said element in a range effective to eliminate said gaseous products sweeping by said element while also providing substantially all of the heat to elevate the temperature in said cavity to the upper limit of the heat cleaning temperature range.

2. A cooking oven according to claim 1 wherein:
    said circuit interrupting means comprises thermal cycling switch means.

3. A cooking oven according to claim 1 wherein:
    said temperature range extends from about 1200° F. to about 1550° F.

4. An oven of the character adapted to be heat cleaned to remove food soils therein by elevating the temperature in said oven to a heat cleaning range, comprising:
    means defining a cooking cavity including a top wall;
    a broil heating element mounted closely below said top wall;
    means defining a plurality of vent openings located closely above said heating element so that gaseous products exiting through said vent openings are constrained to sweep closely over said heating element; and
    circuit means connecting said broil heating element to a source of power, said circuit means including switch means for connecting said element one way to produce full wattage for a broiling operation, and for connecting said element in another way for operation in a cycling mode at a reduced wattage rate for a heat cleaning operation maintaining a surface temperature of said element in a range effective to eliminate said gaseous products sweeping by said element while also providing substantially all of the heat to elevate the temperature in said cavity to the upper limit of the heat cleaning range.

5. An oven according to claim 4 wherein:
said circuit means includes a thermal cycling switch for cyclically energizing said heating element to obtain said reduced wattage rate.

6. An oven according to claim 5 wherein:
said cyclical energization of said cycling switch is a rate to produce a surface temperature of said heating element in the range of about 1200° F. to 1550° F. during that period of heat cleaning during which said element is energized.

References Cited

UNITED STATES PATENTS

| | | | |
|---|---|---|---|
| 3,290,483 | 12/1966 | Hurko | 219—409 X |
| 3,353,004 | 11/1967 | Alexander | 219—412 X |

BERNARD A. GILHEANY, *Primary Examiner.*

H. B. GILSON, *Assistant Examiner.*

U.S. Cl. X.R.

219—409